Figure 1:
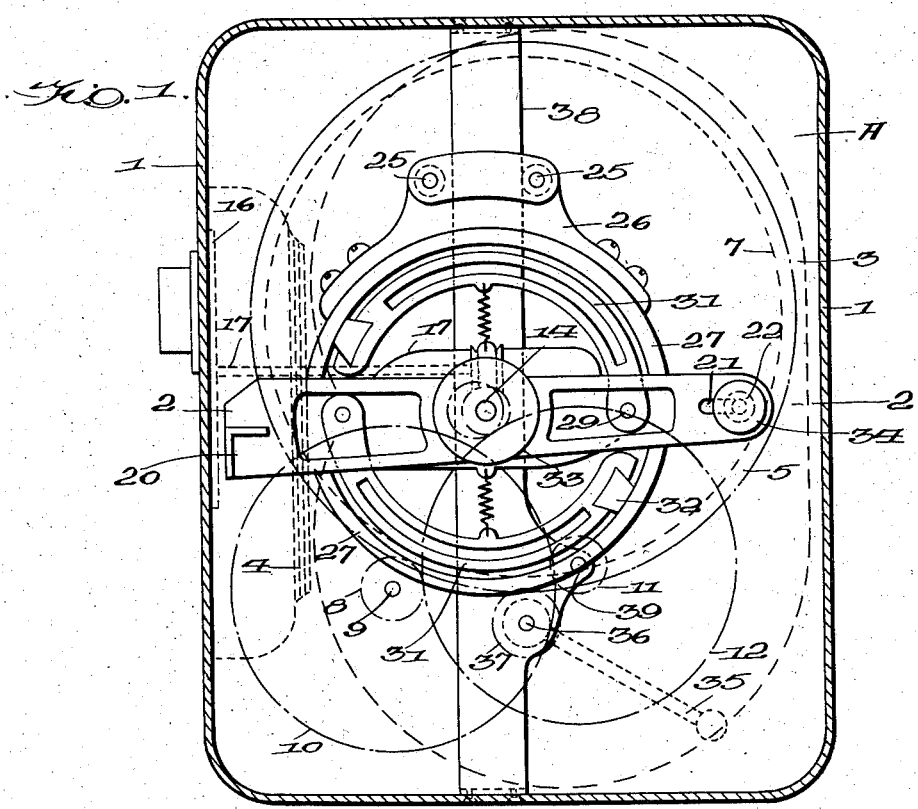

Aug. 12, 1930.  O. FISCHER  1,772,772

CINEMATOGRAPHIC CAMERA

Filed Aug. 8, 1925

Inventor:
Otto Fischer,
By Paul E. Schilling,
Attorney.

Patented Aug. 12, 1930

1,772,772

UNITED STATES PATENT OFFICE

OTTO FISCHER, OF DRESDEN, GERMANY, ASSIGNOR TO THE FIRM: I C A, AKTIEN-GESELLSCHAFT, OF DRESDEN, GERMANY

CINEMATOGRAPHIC CAMERA

Application filed August 8, 1925, Serial No. 49,055, and in Germany August 9, 1924.

My invention refers to a cinema-camera which is operated by a motor device in which the spring and the driving mechanism are located in a casing. By thus arranging the said driving elements it is rendered possible to considerably simplify the mechanism and also to reduce the volume of the apparatus to a minimum.

According to my invention this arrangement can be improved by fastening the regulator of the motor device on the driving shaft of the intermittent device which usually carries the fly wheel and the eccentric causing the reciprocating movement of the film feeding member. In the case of the fly wheel being adapted at the same time to serve as a regulator for the motor device, the greatest possible simplicity is attained. By arranging the said elements on the drive-shaft the otherwise necessary means for transmission, which make the apparatus expensive and bulky can be dispensed with. The arrangement also effects a reduction of the necessary driving power because it does away with several gear wheels and shafts, so that a smaller motor device will be sufficient.

In the drawing—

Figure 2:
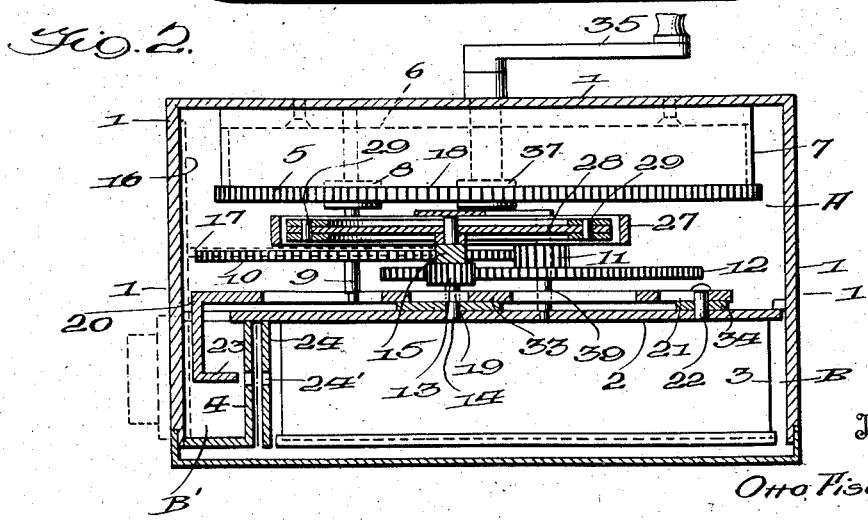

Figure 1 is an interior view of the device taken substantially on the line 1—1 of Figure 2; and Figure 2 is a section on the line 2—2 of Figure 1.

Referring more particularly to the drawing, the numeral 1 indicates the casing of the camera which is divided by a partition into two compartments A and B. The compartment A contains the entire driving mechanism, while the compartment B receives the film holder C and the film guide 4 past which the film is fed for exposure by the shutter mechanism 16.

The driving mechanism consists of a housing 7 secured to the rear wall of the casing 1 and containing the usual spring 6 which constitutes the motor for operating the drive shaft 14. The housing 7 also has mounted for rotation thereon the gear 5 which is connected to the spring in any well known manner so that said spring may be wound by operating the crank 35 which drives the shaft 36 upon which a gear 37 is mounted, this latter gear meshing with the gear 5. Also meshing with the gear 5 is a small gear 8 mounted on the shaft 9. A large gear 10 is carried by the shaft 9 and engages the small gear 11 on the shaft 39. On the same shaft with the gear 11 is a large gear 12 which drives the gear 13 mounted on the main shaft 14. This latter shaft drives a worm 15 mounted on the shaft 18 and said worm operates the shutter mechanism through the medium of the shaft 17.

The shaft 14 has thereon the eccentric or cam 19 which oscillates and reciprocates the film feeding member 20. This member is provided with a slot 21 at one end in which is engaged a pin 22 carried by the partition 2 so as to support said member in position and form a pivot for its oscillations. The member 20 is spaced from the partition 2 by means of the disks 33 and 34. At the other end of the member 20 the same is provided with an offset extension or pawl 23 which, as the member 20 is operated, is projected through the wall of the guide 4 and also through an opening 24 in the wall 24' to control the feeding of the film which passes between said walls so that one film at a time is fed to the shutter for exposure. The film which is within the holder 3 is mounted on feeding and take-up rolls (not shown) of any desired and well known construction.

The regulator for controlling the speed of the shaft 14 includes a drum 27 supported by means of a bracket 26 which is secured to the partition by screws 25. On the drive shaft 14 there is mounted the plate 28 having pivots 29 at the ends thereof. Mounted on the pivots are the opposed arms 31 connected to the plate by means of springs 30 which normally tend to draw said arms inwardly toward the axis of rotation of the plate 28. However, as this plate is rotated the centrifugal force has a tendency to swing the free ends of the arms outwardly to frictionally engage the brake shoes 32 with the inner surface of the drum 27, thus producing a braking action which will regulate the speed of rotation of the shaft 14 which is under the influence of the spring 6.

The compartment A has therein a support 38 which forms a bearing for the shafts 14, 36 and 39, as clearly shown in Figure 1. The casing 1 is provided with a side cover plate 40 which may be removed if desired.

What is claimed is:

1. In a cinematographic camera, a casing having a partition dividing the same into compartments, a film holder in one compartment, a spring motor in the other compartment, a driving shaft operated by said motor, a film feeding member also in the latter compartment and supported by said partition, said partition having an opening in which a portion of the feeder is movable for engagement with the film, means on said shaft for imparting reciprocating and oscillating movements to said member to feed the film in said holder, and a regulator also on said shaft for controlling the speed of rotation thereof.

2. In a cinematographic camera, a casing having a partition dividing the same into compartments, a film holder in one compartment, a spring motor in the other compartment, a driving shaft operated by said motor, a combined reciprocatory and oscillatory film feeding member also in the latter compartment and supported and guided in its movements upon said partition, an eccentric disk directly mounted on said shaft and directly engaging said feeding member for imparting reciprocating and oscillating movements to said member to feed the film in said holder, the said partition having an opening therein in which a portion of the feeder is movable for engagement with the film, speed governing means for said shaft including a stationary drum, a plate carried by said shaft, and braking elements pivoted to said plate and engageable with said drum to control the speed of said shaft.

3. In a cinematographic camera, a casing having a longitudinal partition dividing it into two main chambers, a film holder arranged in one of the main chambers, driving means arranged in the other main chamber, a double walled transverse partition forming a film guide and an auxiliary chamber arranged in line with the main chamber containing the film holder, the walls of said guide having openings respectively connecting the film guide with said first-mentioned main chamber and the auxiliary chamber with said film guide, and a feeder actuated by said driving means and mounted for movement on said longitudinal partition, said longitudinal partition having an opening connecting the chamber in which the driving means is arranged with the auxiliary chamber, and said feeder having an extension projecting through said opening into the auxiliary chamber and coacting with the openings in the walls of the transverse partition for engagement with the film for a feeding action thereof.

In testimony whereof I affix my signature.

OTTO FISCHER.